United States Patent
Kubo et al.

(10) Patent No.: US 6,671,814 B1
(45) Date of Patent: Dec. 30, 2003

(54) USB DEVICE AND USB CONNECTING SYSTEM

(75) Inventors: Shinya Kubo, Tokyo (JP); Kazuyuki Sumida, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/408,266

(22) Filed: Sep. 29, 1999

(30) Foreign Application Priority Data

Sep. 29, 1998 (JP) .......................................... 10-275308

(51) Int. Cl.⁷ ............................. G06F 1/26; G06F 13/00
(52) U.S. Cl. ...................... 713/324; 713/330; 710/100
(58) Field of Search ................................. 713/324, 300, 713/320, 330; 710/63, 100, 8

(56) References Cited

U.S. PATENT DOCUMENTS

| | | | |
|---|---|---|---|
| 5,012,120 A | * | 4/1991 | Minagawa et al. ......... 307/151 |
| 5,675,813 A | * | 10/1997 | Holmdahl ...................... 710/8 |
| 5,781,028 A | * | 7/1998 | Decuir ......................... 326/21 |
| 5,818,948 A | * | 10/1998 | Gulick ......................... 381/77 |
| 5,940,448 A | * | 8/1999 | Kuo ........................... 375/316 |
| 6,064,554 A | * | 5/2000 | Kim ............................ 361/64 |
| 6,073,195 A | * | 6/2000 | Okada ........................ 710/301 |
| 6,085,325 A | * | 7/2000 | Jackson et al. ............. 713/300 |
| 6,147,682 A | * | 11/2000 | Kim ........................... 345/211 |
| 6,253,267 B1 | * | 6/2001 | Kim et al. ................... 710/302 |

FOREIGN PATENT DOCUMENTS

| | | | |
|---|---|---|---|
| JP | 61-117444 | 8/1986 | |
| JP | 61-173325 | 8/1986 | |
| JP | 61-288725 | 12/1986 | |
| JP | 02090209 A | * 3/1990 | .......... G05B/23/02 |
| JP | 9-163202 | 6/1997 | |
| JP | 10-97352 | 4/1998 | |
| JP | 10-116139 | 5/1998 | |
| JP | 10-164668 | 6/1998 | |
| JP | 10-326128 | 12/1998 | |

OTHER PUBLICATIONS

Kevin Lynn, Universal Serial Bus (USB) Power Management, 1998 IEEE, Senior Power Application Engineer Micrel Semiconductor.*

* cited by examiner

Primary Examiner—Dennis M. Butler
Assistant Examiner—Suresh K Suryawanshi
(74) Attorney, Agent, or Firm—Sughrue Mion, PLLC

(57) ABSTRACT

A USB device comprises a USB connector 1 for connecting it to a USB or HUB of a host and a serial interface engine (SIE) 2 serving as an interface. The USB connector 1 and the SIE 2 are interconnected by four signal lines defined in a USB. Of these signal lines, a 5-V power supply line for supplying 5-V power to the SIE 2 is provided with a switch 3 for electrically on-off switching it. The user can readily control the power supply from the host to the USB switch by operating the switch. Thus, when the USB device is not used, the power supply from the host can be stopped to reduce power consumption of the host.

9 Claims, 4 Drawing Sheets

USB DEVICE AND USB CONNECTING SYSTEM

BACKGROUND OF THE INVENTION

The present invention relates to USB devices and USB connecting systems using USB interfaces and, more particularly to a USB device or a USB connecting system capable of reducing power consumption of a host which supplies power thereto.

Recently, a universal serial bus (hereinafter referred to as USB) has been proposed as an external bus for interconnecting a personal computer (hereinafter referred to as host) and peripheral units. Since the USB is a "serial" bus, it has only four signal pins including those of a power supply line. It is thus possible to produce a thin cable and a small size connector for cost reduction, thus permitting more inexpensive peripheral units.

An utmost feature of the USB resides in that a plurality of different kinds of peripheral units can be supported by this single bus. In the conventional general-purpose interfaces such as keyboards, mouse devices, parallel ports and serial ports, the capability of connecting a plurality of peripheral units has been hardly considered. Recently, however, a USB has been proposed, which is capable of connecting and controlling up to 127 peripheral units at a time. In addition, up to 16 end points can be defined in a single peripheral unit. In other words, a single peripheral unit can be provided with up to 16 different functions.

However, once the USB device using the above USB interface is connected to a personal computer, power is supplied thereto from a host USB so long as it remains connected. That is, even when the USB device is not used, predetermined power is supplied from the USB device. To turn off the power supply for saving consumed power, the USB connector should be withdrawn from the host side USB.

Where the USB device is connected to the host internally of the same, the USB connector can not be withdrawn. Therefore, predetermined power is always supplied from the USB device irrespective of whether the USB device is used, thus resulting in wasteful power consumption.

Moreover, where the USB device is always connected to the host and used in a place distant therefrom, like the case when the USB device is not used, it is impossible to turn off the power supply.

SUMMARY OF THE INVENTION

The present invention was made in view of the above problems, and it has an object of providing a USB device or a USB connecting system using a USB interface capable of turning off the power supply from the host thereto without need of withdrawing the USB connector when stopping its operation.

According to an aspect of present invention, there is provided a USB device using a USB interface, comprising switching means for electrically on-off switching a 5-V power supply line for transmitting 5-V power supplied from an upper rank unit.

The USB device is connected by a connector to the upper rank unit either directly or via an HUB; and the switching means electrically on-off switches the 5-V power supply line led from the connector.

According to another aspect of the present invention, there is provided a USB device using a USB interface, comprising: input means for inputting settings from an operator; and control means for electrically connecting a 5-V power supply line for transmitting 5-V power supplied from an upper rank unit and then electrically connecting data lines in the USB device when an "on" setting signal is provided from the input means, and electrically disconnecting the data lines and then electrically disconnecting the 5-V power supply line when an "off" setting signal is provided from the input means.

The USB device is connected by a connector to the upper rank unit either directly or via an HUB; and the control means controls the on-off switching of the 5-V power supply line and the data lines led from the connector.

According to other aspect of the present invention, there is provided a USB connecting system in which a USB device is connected by a USB interface to an upper rank unit either directly or via an HUB, wherein: the upper rank unit includes a driver for sending out a control signal for turning of f the power supply to the USB device; the USB device includes: power supply control means for on-off switching a 5-V power supply line for transmitting 5-V power supplied from the upper rank unit to the USB device and data lines for supplying data from the upper rank unit to the USB device side and transmitting data from the USB device side to the upper rank unit; and USB control means for transmitting a setting signal for disconnecting the 5-V power supply line and the data lines to the power supply control means when recognizing the control signal for turning off the power supply from the driver to the USB device; and power supply control means disconnects the data lines and then disconnects the 5-V power supply line in response to the setting signal from the USB control means for disconnecting the 5-V power supply line and the data lines.

The USB device includes input means for inputting settings from an operator; and the power supply control means connects the 5-V power supply line and then connects the data lines when a setting for connecting the upper rank unit and the USB device is provided form the input means.

According to still other aspect of the present invention, there is provided a USB device using a USB interface, comprising: a USB connector for connecting a USB device to a USB or HUB in a host; a serial interface engine serving as an interface interconnected by signal lines including a data line and a power supply line; and a switch connected to the power supply line for connecting and disconnecting the power supply line to the USB device.

According to further aspect of the present invention, there is provided a USB device using a USB interface, comprising: a USB connector for connecting a USB device to a USB or HUB in a host; a serial interface engine (SIE) serving as an interface interconnected by signal lines including a data line and a power supply line; and a switch for setting on/off state; a delay circuit provided between the USB connector and the serial interface engine for time-sequentially on-off switching the power supply line and the data line in accordance with the on/off state of the switch.

The delay circuit interconnects the USB connector and the serial interface engine in the order of the power supply line and the data line when the switch sets on state and disconnects the USB connector and the serial interface engine in the order of the data line and the power supply line when the switch sets off state.

The delay circuit interconnects the USB connector and the serial interface engine in the order of the power supply line and the data line after the lapse of a predetermined time since the power supply line connection when the switch sets the on state and disconnects the USB connector and the serial interface engine in the order of the data line and the power supply line after the lapse of a predetermined time since the power supply line disconnection when the switch sets the off state.

According to still further aspect of the present invention, there is provided a USB device using a USB interface, comprising: a USB connector for connecting a USB device to a USB or HUB in a host; a serial interface engine serving as an interface interconnected by signal lines including a data line and a power supply line; and a switch for setting on/off state; a USB control unit for recognizing a signal indicative of "power off" transmitted from the host side through control transfer and transmitting a "power off" setting signal; a power supply control unit provided between the USB connector and the serial interface engine for time-sequentially on-off switching the power supply line and the data line in accordance with the on/off state of the switch and the "power off" setting signal from the USB control unit.

The power supply control unit interconnects the USB connector and the serial interface engine in the order of the power supply line and the data line after the lapse of a predetermined time since the power supply line connection when the switch sets the on state and disconnects the USB connector and the serial interface engine in the order of the data line and the power supply line after the lapse of a predetermined time since the power supply line disconnection when the switch sets the off state or the "power off" setting signal from the USB control unit.

The power supply line is provided with 5-V.

According to further aspect of the present invention, there is provided a power supply control method of a USB device using a USB interface having signal lines including a data line and a power supply line, wherein the power supply line and the data line are time-sequentially on-off switched in accordance with an on/off instruction.

Other objects and features will be clarified from the following description with reference to attached drawings.

PREFERRED EMBODIMENTS OF THE INVENTION

Preferred embodiments of the present invention will now be described with reference to the drawings.

Figure 1:
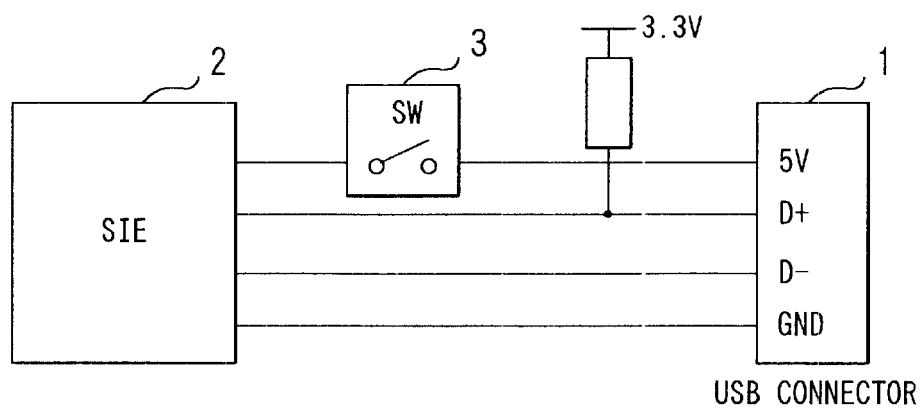
FIG. 1 is a block diagram showing a partial structure of a first embodiment of the present invention.

Referring to FIG. 1, a USB connector 1 for connecting the USB device in a first embodiment of the present invention to a USB or HUB in a host and a serial interface engine (hereinafter referred to as SIE) 2 serving as an interface, are interconnected by four signal lines which are defined to be the USB. The four signal lines comprise two data lines (D+ and D-) and two power supply lines (i.e., a 5-V power supply line connecting a 5-V power supply and a grounding line). In this embodiment, the 5-V power supply line noted above is provided with a switch 3 for on-off switching the 5-V power supply line.

The USB device shown in FIG. 1 pulls up the data line D+ to 3.3 V. The USB is operable in either a data transfer mode at a high or full data transfer rate of 12 Mbps or a data transfer mode at a low data transfer rate of 1.5 Mbps at the most. The data transfer mode at the full rate can be set by pulling the data line D+, and the data transfer mode at the low rate can be set up by pulling up the data line D-.

The embodiment of the USB device will now be described with reference to FIG. 1. When operating the USB device, the 5-V power supply line is connected by the switch 3. When the 5-V power supply line is connected by the switch 3, the power is supplied to the USB device, and also the data line D+ is held at a high level. An idle state of the USB device is thus brought about, and the host recognizes that the USB device has been connected, and starts enumeration.

When the USB device connected to the host is not used, the 5-V power supply line can be turned off by the switch 3. By so doing, the power supply to the USB device is turned off, and at the same time the data lines D+ and D- are held at a low level. Thus, the host recognizes single ended 0, and turns off the bus.

As shown above, in this embodiment of the USB device, with the 5-V power supply line on-off switch 3 provided in the 5-V power supply line connecting the USB connector 1 and the SIE 2 in the USB device, the user can on-off switch the power supply to the USB device without need of withdrawing the USB connector from the USB or HUB of the host. Thus, in the case where the USB device is connected to the host internally of the same or is always connected to the host and used in a place distant therefrom, it is possible to turn off the power supply to the USB device when the device is not used, thus reducing power consumption of the host.

Figure 2:
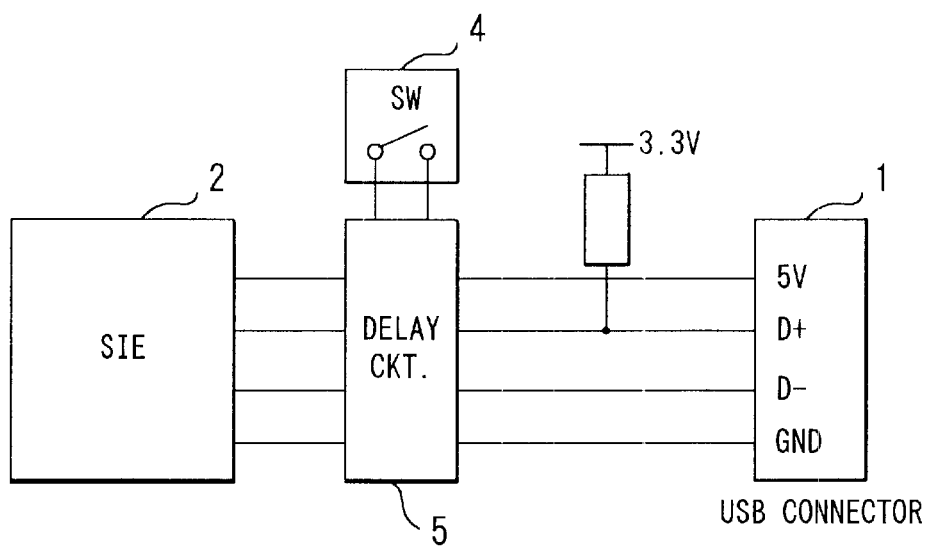
FIG. 2 is a block diagram showing a partial structure of a second embodiment of the present invention.

A second embodiment of the present invention will now be described with reference to FIG. 2. Referring to the FIGURE, a USB connector 1 to be connected to the USB or HUB of a host of the USB device in the second embodiment and an SIE 2 serving as an interface, are interconnected by four signal lines defined as the USB.

In the second embodiment of the USB device, a delay circuit 5 for time-sequentially on-off switching the 5-V power supply line and the data lines D+ and D- in accordance with the on-off switching of a switch 4, is provided between the USB connector 1 and the SIE 2. Again the second embodiment of the USB device is set to the full rate data transfer mode by pulling up the data line D+ to 3.3 V.

When the switch 4 is turned on by the user the delay circuit 5 interconnects the USB connector 1 and the SIE 2 in the order of the 5-V power supply line and the data lines D+ and D-. When the switch 4 is turned off by the user, the delay circuit 5 disconnects the USB connector 1 and the SIE 2 in the order of the data lines D+ and D- and the 5-V power supply line.

Figure 3:
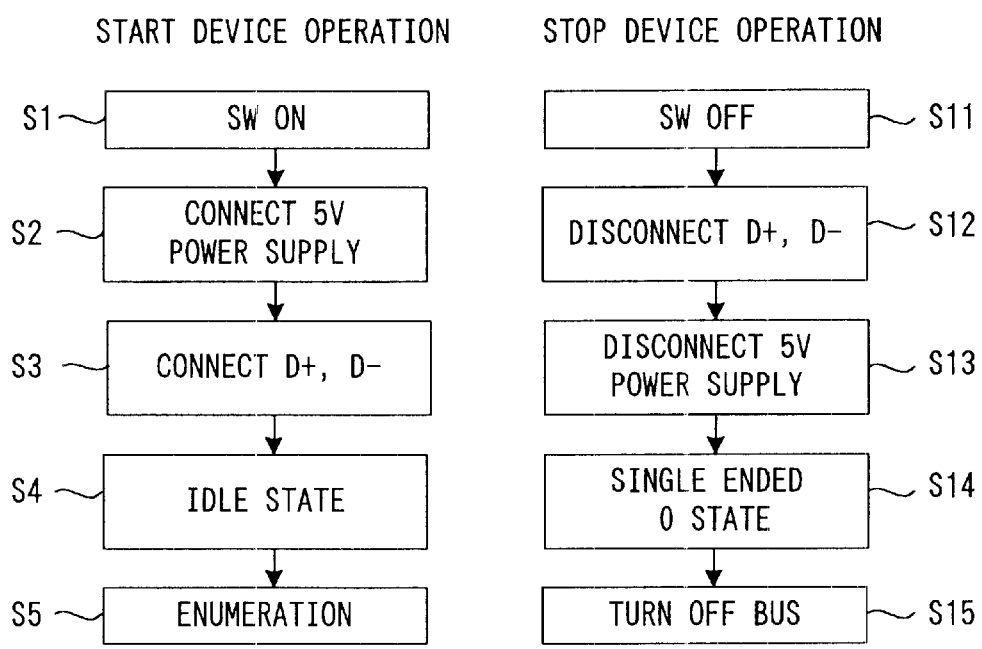
FIG. 3 is a flow chart showing operation procedure of the second embodiment of the present invention.

A process operation sequence of the second embodiment of the USB device shown in FIG. 2 will now be described with reference to the flow chart of FIG. 3.

When starting the operation of the USB device, the switch 4 in the "off" state is turned on (step S1). When the switch 4 is turned on, the delay circuit 5 first connects the 5-V power supply line between the USB connector 1 and the SIE 2 (step S2). Then, after the lapse of a predetermined time (for instance 100 ms) since the 5-V power supply line connection, the delay circuit 5 connects the data lines D+ and D− (step S3). As a result, the USB device is brought to the idle state (step S4). The host recognizes that the UBS device has been connected, and starts the enumiration (step S5).

When stopping the operation of the USB device, the user turns off the switch 4 in the "on" state (step S11). When the switch 4 is turned off, the delay circuit 5 first disconnects the data lines D+ and D− between the USB connector 1 and the SIE 2 (step S12). After the lapse of a predetermined time (for instance 100 ms) since the data line disconnection, the delay circuit 5 disconnects the 5-V power supply line (step S13). With the data lines D+ and D− brought to the low level, the power supply to the USB device is turned off, and the UBS device is brought to the single ended 0 state (step S14). The host recopgnizes the withdrawal of the USB device, and turns off the bus (step S15).

As shown above, with the provision of the delay circuit 5, which serves to time-sequentially on-off switch the signal lines defined in the USB, for connecting the USB connector 1 for connecting the USB device to the USB or HUB of a host and the SIE 2 serving as an interface according to the on-off switching of the switch 4, when the USB device is not used, the power supply thereto can be turned off without need of withdrawing the USB connector.

In addition, since the delay means for time-sequentially on-off switches the signal lines in accordance with the on-off switching of the switch 4, in the case where the USB device is connected to the host internally of the same or is always connected to the host and used in a place distant therefrom, it is possible to turn off the power supply to the USB device when the device is not used, thus reducing power consumption of the host.

Furthermore, the delay circuit 5 operates in accordance with the on-off switching of the switch 4; specifically, it connects the 5-V power supply line and the data lines D+ and D− in the mentioned order when the switch 4 is turned on, and disconnects the data lines D+ and D− and the 5-V power supply line in the mentioned order when the switch 4 is turned off. Thus, the circuits on the USB device side and the host side are not brought to an unstable state, and it is possible to prevent erroneous operation.

Figure 4:
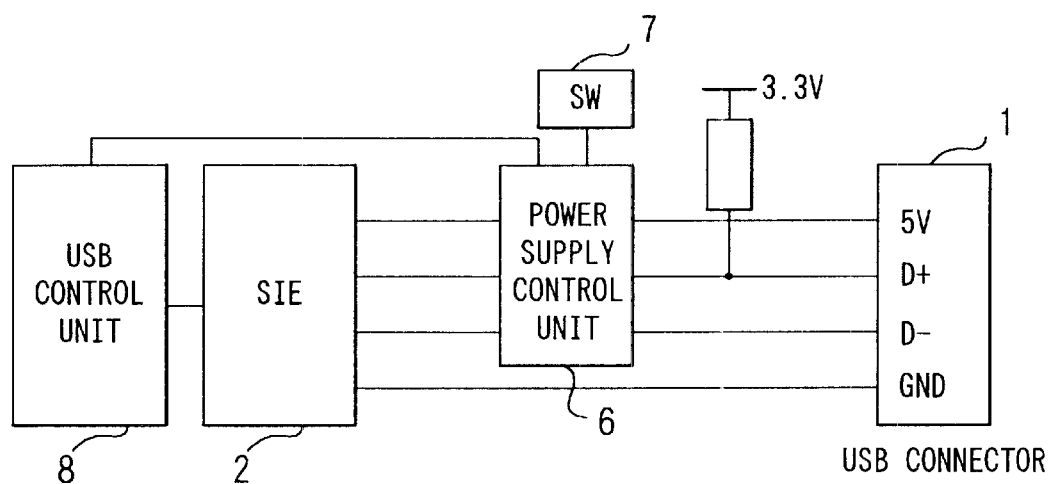
FIG. 4 is a block diagram showing a partial structure of a third embodiment of the present invention.

A third embodiment of the present invention will now be described with reference to FIG. 4. Referring to the FIGURE, in the third embodiment of the USB device a USB connector 1 for connecting the device to a USB or HUB of a host and an SIE 2 serving as an interface are interconnected by four signal lines defined in the USB.

The third embodiment of the USB device comprises a power supply control unit 6 provided between the USB connector 1 and the SIE 2, a switch 7 connected to the power supply control unit 6, and a USB control unit 8 connected to the SIE 2 which is also connected to the USB connector 1 by the four signal lines defined in the USB, on the side opposite the power supply control unit 6.

The power supply control unit 6 on-off switches (connects-disconnect) the 5-V power supply line and the data lines D+ and D− interconnecting the USB connector 1 and the SIE 2 according to a setting signal from the switch 7 or the USB control unit 8. When the "power "off"" state is set by the switch 7 or the USB control unit 8, the power supply control unit 6 first disconnects the data lines D+ and D− interconnecting the USB connector 1 and the SIE 2, and after the lapse of a predetermined time it disconnects the 5-V power supply line interconnecting the USB connector 1 and the SIE 2. When the "power "on"" state is set by the switch 7, the power supply control unit 6 first connects the 5-V power supply line between the USB connector 1 and the SIE 2, and after the lapse of a predetermined time it connects the data lines D+ and D− between the USB connector 1 and the SIE 2.

When the switch 7 is on-off switched by the user, it outputs a corresponding setting signal to the power supply control unit 6. Also, when a signal indicative of "power "off"" is transmitted from the a driver in the host side USB device by control transfer to the USB device, the USB control unit 8 recognizes this signal and transmits a "power "off"" setting signal to the power supply control unit 6.

Figure 5:
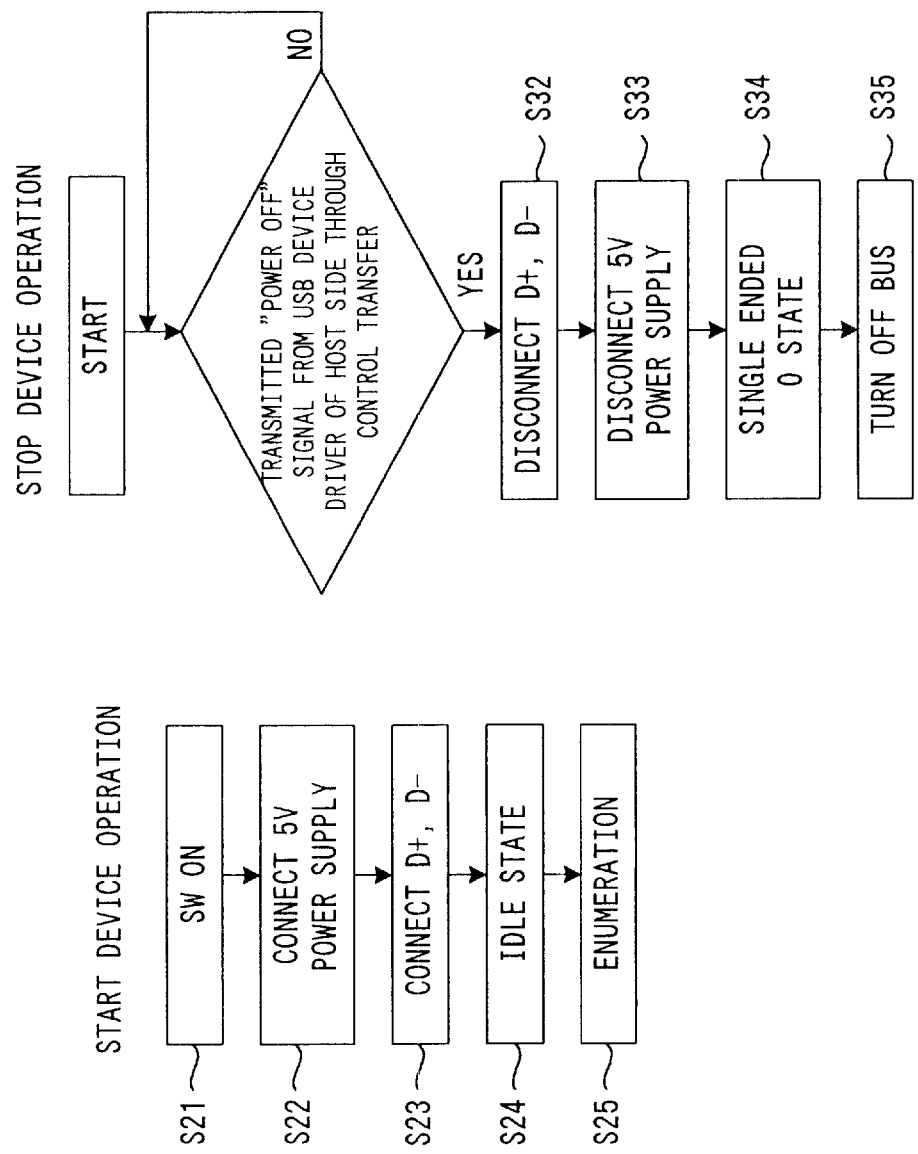
FIG. 5 is a flow chart showing operation procedure of the third embodiment of the present invention.

A process operation sequence of the USB device having the above construction will now be described with reference to the flow chart shown in FIG. 5. When operating the USB device, the user turns on the switch 7 (step S21). When the "power "on"" setting signal is supplied from the switch 7, the power supply control unit 6 first connects the 5-V power supply line between the USB connector 1 and the SEE 2 (step S22). Then, after the lapse of a predetermined time (for instance 100 ms), the power supply control unit 6 connects the data lines D+ and D− between the USB connector 1 and the SIE 2. Thus, an idle state of the USB device is brought about (step 524), and the enumeration is started (step S25).

When stopping the operation of the USB device, in a closed state of a host side application for operating the USB device the host side USB device driver transfers a signal indicative of "power "off"" by the control transfer to the USB device. When the USB power control unit 8 recognizes the "power "off"" signal (YES in STEP S31), it transmits a power "off" setting signal to the power supply control unit 6. With the transmission of the power "off" setting signal from the USB control unit 8, the power supply control unit 6 first disconnects the data lines D+ and D− interconnecting the USB connector 1 and the SIE 2 (step S32). Then, after the lapse of a predetermined time (for instance 100 ms), the power supply control unit 6 disconnects the 5-V power supply line interconnecting the USB connector 1 and the SIE 2 (step S33). As a result, the data lines D+ and D− are set to a low level to turn off the power supply to the USB device. The single ended zero state of the UBS device is thus brought about (step S34), and the host recognizes that the USB device has been withdrawn, and turns off the bus (step S35).

As described above, when the USB control unit 8 recognizes the power "off" signal transmitted by the control transfer from the host side USB device driver, it transmits the power "off" setting signal to the power supply control unit 6, and the power supply control unit 6 thus disconnects the USB connector 1 and SIE 2 in the order of the data lines D+ and D− and the 5-V power supply line.

In addition, the user can stop the operation of the USB device without need of turning off power supplied to the USB device by himself or herself. That is, it is not possible that the power is continually supplied to the USB device in the inoperative state thereof due to negligence of turning off the power supply, thus permitting power consumption reduction of the host.

Furthermore, when the user turns on the switch 7, the power supply control unit 6 connects the 5-V power supply line between the USB connector and the SIE 2 and then connects the USB connector and the SIE data lines. Thus, in the case where the USB device is connected to the host internally of the same or is always connected to the host and used in a place distant therefrom, it is possible to turn off the power supply to the USB device when the device is not used, thus reducing power consumption of the host.

Still further, when the power "off" setting signal is transmitted from the USB control unit 8, the power supply control unit 6 disconnects the data lines D+ and D− and the 5-V power supply line in the mentioned order, and when the power "on" setting signal is transmitted from the switch 7 it connects the 5-V power supply line and the data lines D+ and D− in the mentioned order. Thus, the circuits in the USB device side and the host side are not brought to an unstable state, and it is possible to prevent erroneous operation.

The above embodiments are suitable examples of carrying out the present invention. However, the above embodiments are by no means limitative and can be modified variously without departing from the scope and spirit of the present invention. For example, while the above embodiment has concerned with USB devices set in the high rate data transfer mode, the same effects are also obtainable with a USB device set in a low rate data transfer mode by adopting the same construction as the above embodiments. Also, while in the above embodiments the switch, the delay circuit, etc. are provided in the 5-V power supply line, on which the 5-V power supplied from the host is transmitted from the USB connector 1 to the SIE 2, this is by no means limitative. That is, these components may not be provided in the positions as described above, but may be provided at any position so long as it is possible to turn off the 5-V power supplied from the host.

As has been made obvious in the foregoing, the USB device according to the present invention comprises switching means for electrically on-off switching the 5-V power supply line for transmitting 5-V power supplied from the upper rank position. Thus, the operator can on-off switch the 5-V power supply line for transmitting power supplied from an upper rank unit to the USB device with the switching means. As a result, in the case where the USB device is connected to the host internally of the same or is always connected to the host and used in a place distant therefrom, it is possible to reduce power consumption in the upper rank unit.

The USB device according to the present invention also comprises input means for inputting settings of the operator, and control means operable according to the setting signal from the input means such as to connect the 5-V power supply line for transmitting 5-V power supplied from the upper rank unit and then connect the data lines of the USB device when the setting signal is "on" and disconnecting the 5-V power supply line after disconnecting the data lines of the USB device when the setting signal is "off". The operator thus can on-off switch the 5-V power supply line for transmitting power supplied from the upper rank unit to the USB device with the input means. Thus, in the case where the USB device is connected to the host internally of the same or is always connected to the host and used in a place distant therefrom, it is possible to reduce consumption in the upper rank unit.

When the USB device turns on (is supplied with) the power supply from the upper rank unit, the control means first connects the 5-V power supply line and then connects the data lines. When the USB device turns off the power supply from the upper rank unit, the control means first disconnects the data lines and then disconnects the 5-V power supply line. Thus, the circuits in the USB device side and the host side are not brought to an unstable state, and it is possible to prevent erroneous operation.

The USB connecting system according to the present invention comprises a driver for transmitting by the control transfer to the upper rank unit a power "off" setting signal for turning off the power supplied to the USB device. When the USB control means in the USB device recognizes the control transfer of the power "off" setting signal from the driver for turning off power supplied to the USB device, the power supply control means transmits a "disconnect" setting signal for disconnecting the 5-V power supply line for transmitting 5-V power supplied from the upper rank unit and the data lines in the USB device. After the power supply control means has electrically disconnected the data lines and then the 5-V power supply line in response to the 5-V power line/data line "disconnect" setting signal from the USB control means, the operator can stop the operation of the USB device without need of considering the turning-off of the power supplied to the USB device. Also, it is not possible that the power is continually supplied to the USB device in the inoperative state thereof due to negligence of turning off power supply.

Furthermore, with the provision in the USB device of input means for inputting the operator's settings, the power supply control means connects the 5-V power supply line and then the data lines when a setting for interconnecting the upper rank unit and the USB device is provided from the input means. Thus, in the case where the USB device is connected to the host internally of the same or is always connected to the host and used in a place distant therefrom, it is possible to readily control power supply to the USB device.

When the USB device turns on the power supply from the upper rank unit, the power supply control means connects the 5-V power supply line and then connects the data lines, and when the USB device turns off the power supply from the upper rank unit, the power supply control means disconnects the data lines and then disconnects the 5-V power supply line. Thus, the circuits on the USB device side and the upper rank unit side are not brought to an unsteady state, and it is thus possible to prevent erroneous operation.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A USB connecting system in which a USB device is connected by a USB interface to an upper rank unit either directly or via an HUB, wherein:

the upper rank unit includes a driver for sending out a control signal for turning off the power supply to the USB device;

the USB device includes:

power supply control means for on-off switching a 5-V power supply line for transmitting 5-V power supplied from the upper rank unit to the USB device and data lines for supplying data from the upper rank unit to the USB device side and transmitting data from the USB device side to the upper rank unit; and USB control means for transmitting a setting signal for disconnecting the 5-V power supply line and the data lines to the power supply control means when recognizing the control signal for turning off the power supply from the driver to the USB device; and power supply control means disconnects the data lines and then disconnects the 5-V power supply line in response to the setting signal from the USB control means for disconnecting the 5-V power supply line and the data lines.

2. The USB connecting system according to claim 1, wherein:

the USB device includes input means for inputting settings from an operator; and power supply control means connects the 5-V power supply line and then connects the data lines when a setting for connecting the upper rank unit and the USB device is provided from the input means.

3. A USB device using a USB interface, comprising:

a USB connector for connecting a USB device to a USB or HUB in a host;

a serial interface engine (SIE) serving as an interface interconnected by signal lines including a data line and a power supply line; and a switch for setting on/off state;

a delay circuit provided between the USB connector and the serial interface engine for time-sequentially on-off switching the power supply line and the data line in accordance with the on/off state of the switch.

4. The USB device according to claim 3, wherein the delay circuit interconnects the USB connector and the serial interface engine in the order of the power supply line and the data line when the switch sets on state and disconnects the USB connector and the serial interface engine in the order of the data line and the power supply line when the switch sets off state.

5. The USB device according to claim 3, wherein the delay circuit interconnects the USB connector and the serial interface engine in the order of the power supply line and the data line after the lapse of a predetermined time since the power supply line connection when the switch sets the on state and disconnects the USB connector and the serial interface engine in the order of the data line and the power supply line after the lapse of a predetermined time since the power supply line disconnection when the switch sets the off state.

6. A USB device using a USB interface, comprising:

a USB connector for connecting a USB device to a USB or HUB in a host;

a serial interface engine serving as an interface interconnected by signal lines including a data line and a power supply line; and a switch for setting on/off state;

a USB control unit for recognizing a signal indicative of "power off" transmitted from the host side through control transfer and transmitting a "power off" setting signal;

a power supply control unit provided between the USB connector and the serial interface engine for time-sequentially on-off switching the power supply line and the data line in accordance with the on/off state of the switch and the "power off" setting signal from the USB control unit.

7. The USB device according to claim 6, wherein the power supply control unit interconnects the USB connector and the serial interface engine in the order of the power supply line and the data line after the lapse of a predetermined time since the power supply line connection when the switch sets the on state and disconnects the USB connector and the serial interface engine in the order of the data line and the power supply line after the lapse of a predetermined time since the power supply line disconnection when the switch sets the off state or the "power off" setting signal from the USB control unit.

8. The USB device according to claims 3 or 6, wherein the power supply line is provided with 5-V.

9. A power supply control method of a USB device using a USB interface having signal lines including a data line and a power supply line, wherein the power supply line and the data line are time-sequentially on-off switched in accordance with an on/off instruction.

* * * * *